(12) United States Patent
Liu et al.

(10) Patent No.: US 6,781,843 B2
(45) Date of Patent: Aug. 24, 2004

(54) COMPUTER ENCLOSURE WITH OPERATING DEVICE

(75) Inventors: Alvin Liu, Tu-Chen (TW); Jung-Chi Chen, Tu-Chen (TW); Liang-Chin Wang, Tu-Chen (TW)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 129 days.

(21) Appl. No.: 10/253,952

(22) Filed: Sep. 23, 2002

(65) Prior Publication Data

US 2003/0210514 A1 Nov. 13, 2003

(30) Foreign Application Priority Data

May 9, 2002 (TW) ...................................... 91206533 U

(51) Int. Cl.[7] ................................................ G08F 1/20
(52) U.S. Cl. ........................ 361/726; 361/683; 361/685
(58) Field of Search .............................. 361/724–727, 361/683–686

(56) References Cited

U.S. PATENT DOCUMENTS 5,510,957 A * 4/1996 Takagi ........................ 361/814
6,157,540 A * 12/2000 Eddings et al. ............. 361/727
6,297,948 B1 * 10/2001 Buican et al. ............... 361/683
6,469,900 B2 * 10/2002 Cheng ......................... 361/726

OTHER PUBLICATIONS

Imamura (2002/0034065 A1), "Electronic Apparatus Having a Main Body on Which a Display Device is Placed", Mar. 21, 2002.*

* cited by examiner

Primary Examiner—Yean-Hsi Chang
(74) Attorney, Agent, or Firm—Wei Te Chung

(57) ABSTRACT

A computer enclosure includes a cage (10), an upper plate (100), two expansion bodies (140), and two operating devices (200). The cage has a chassis (12), a frame (16) received in the chassis, and an anti-EMI plate (18) attached onto the frame. Two recessed portions (102) are formed in the upper plate for accommodating the expansion bodies. The operating devices are attached to opposite sides of the chassis. Each operating device has a releasing device (202), a driving device (204), and a controlling device (206). When a button (258) of each controlling device is pressed inwardly and then pushed forwardly, a driving plate (254) of the controlling device drives the driving device to release the corresponding expansion body from the upper plate. When the buttons of the controlling devices are pressed inwardly and then pushed rearwardly, the driving plates drive the releasing devices to release the frame from the chassis.

23 Claims, 9 Drawing Sheets

COMPUTER ENCLOSURE WITH OPERATING DEVICE

BACKGROUND OF THE INVENTION

1. Field of the Invention

The present invention relates to computer enclosures, and in particular to computer enclosures having operating devices for ready assembly and disassembly thereof.

2. Related Art

A conventional computer enclosure uses a plurality of screws to attach an upper panel and/or side panels to a base frame. An example of a conventional computer enclosure is disclosed in Taiwan Patent Application No. 89211639. A plurality of apertures is defined in a front panel. A plurality of first slots is defined in opposite sides of a frame. A plurality of second slots is defined in opposite flanges of an upper panel. The upper panel is attached to a top of the frame by a plurality of screws. Locking hooks of side panels engagingly extend into corresponding second slots of the upper panel and first slots of the frame. Then, the side panels are secured to the frame by a plurality of screws.

However, such means are cumbersome and time-consuming. Extra components such as rivets or screws increase costs. Furthermore, when inner components of the computer need maintenance or replacement, the side panels are removed from the frame by unscrewing screws at the upper panel and the side panels one by one. In addiction, the screws are typically small and easily lost. This makes it difficult to reassemble the computer.

Thus, a computer enclosure which overcomes the above-mentioned problems is desired.

BRIEF SUMMARY OF THE INVENTION

Accordingly, an object of the present invention is to provide a computer enclosure having operating devices for ready assembly and disassembly of the enclosure.

To achieve the above-mentioned object, a computer enclosure comprises a cage, an upper plate, two expansion bodies, and two operating devices. The cage has a chassis, a frame received in the chassis, and an anti-EMI plate attached onto the frame. Two recessed portions are formed in the upper plate for accommodating the expansion bodies. The operating devices are attached to opposite sides of the chassis. Each operating device has a releasing device, a driving device, and a controlling device. When a button of each controlling device is pressed inwardly and then pushed forwardly, a driving plate of the controlling device drives the driving device to release the corresponding expansion body from the upper plate. When the buttons of the controlling devices are pressed inwardly and then pushed rearwardly, the driving plates drive the releasing devices to release the frame from the chassis.

Other objects, advantages and novel features of the present invention will be drawn from the following detailed description of a preferred embodiment of the present invention with the attached drawings, in which:

DESCRIPTION OF THE PREFERRED EMBODIMENT

Figure 1:
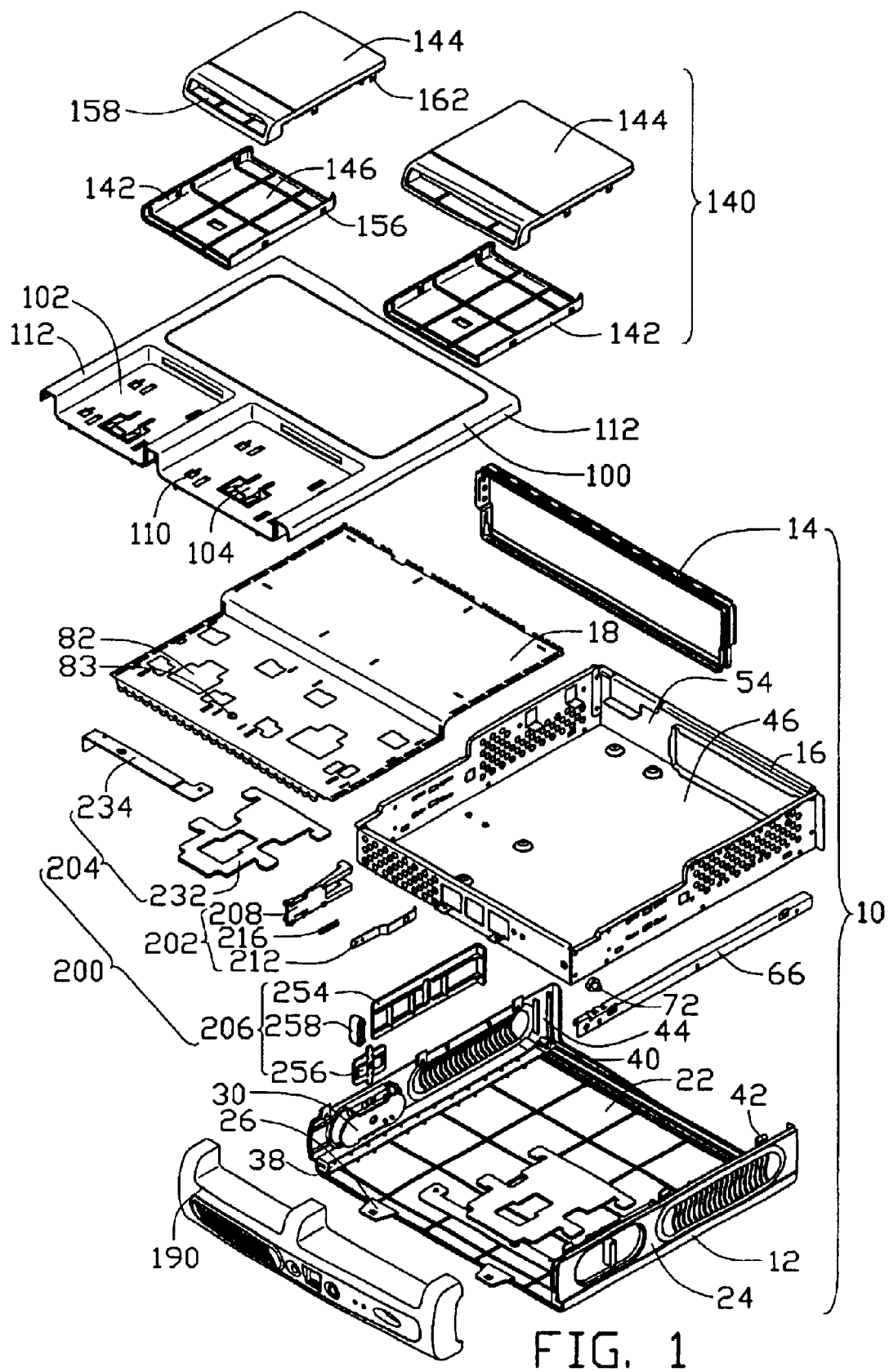
FIG. 1 is an exploded isometric view of a computer enclosure in accordance with the present invention.

Referring to FIG. 1, a computer enclosure in accordance with a preferred embodiment of the present invention comprises a cage 10, an upper plate 100, two expansion bodies 140, a front panel 190, and two operating devices 200.

Referring also to FIGS. 2–6, the cage 10 comprises a chassis 12, a frame 16, a rectangular gasket 14, and an anti-EMI plate 18. The chassis 12 comprises a base plate 22, two side plates 24 extending upwardly from opposite sides of the base plate 22 respectively, and two spaced locking tabs 26 extending forwardly outwardly from a front of the base plate 22. The front panel 190 is attached to the locking tabs 26, and is thereby secured to the chassis 12.

Figure 6:
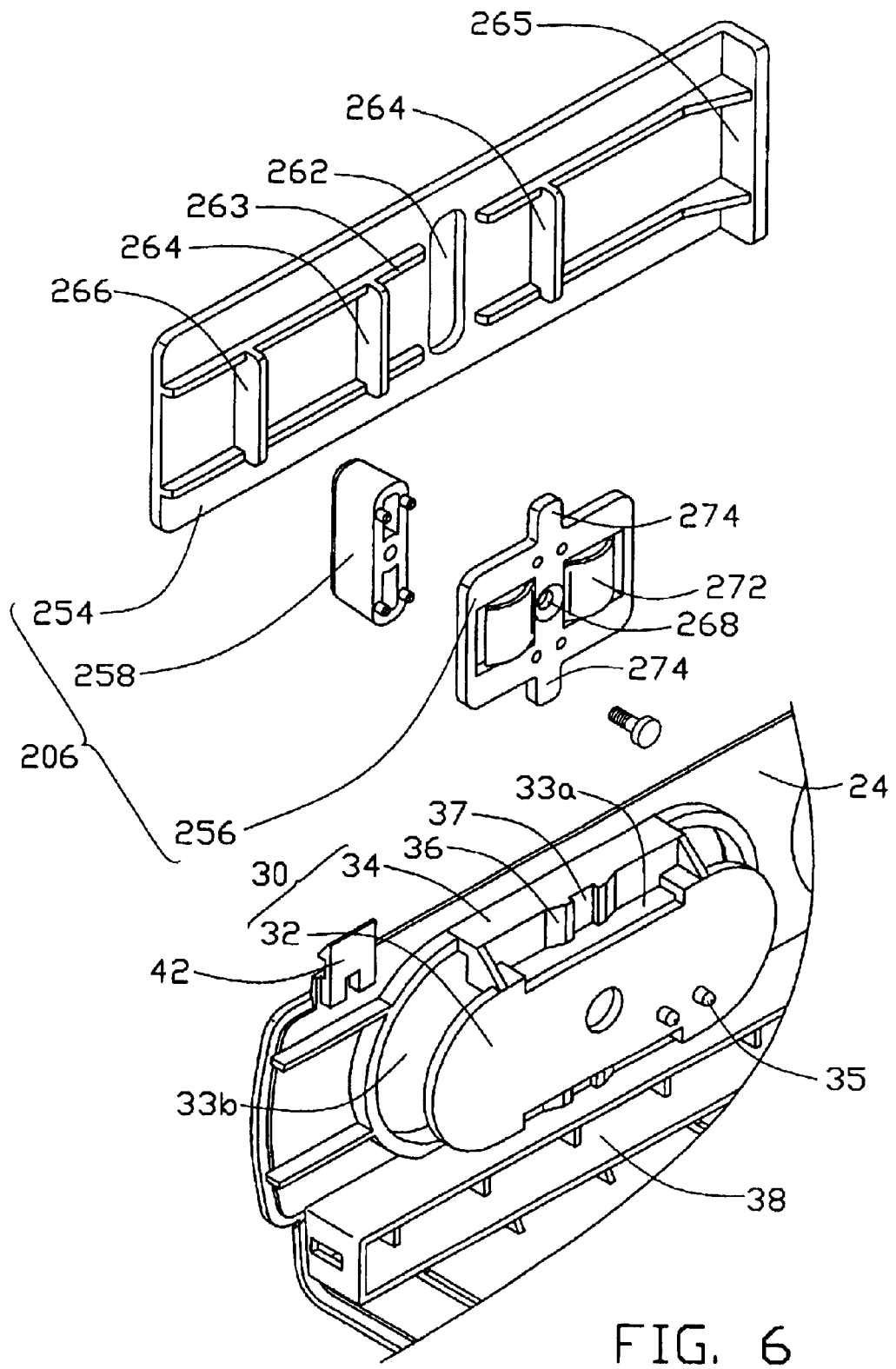
FIG. 6 is an exploded isometric view of a controlling structure of the computer enclosure of FIG. 1.

Referring particularly to FIG. 6, a receiving portion 30 is inwardly formed from each of the side plates 24 of the chassis 12. Each receiving portion 30 comprises a baffle wall 32 and a connecting portion 34. The connecting portion 34 is bifurcated, and connects the side plate 24 with the baffle wall 32 at each of upper and lower sections of the baffle wall 32. A vertical passage 33a is defined in each connecting portion 34, and a horizontal passage 33b is also defined in each connecting portion 34. The vertical and horizontal passages 33a, 33b intersect and communicate with each other. A pair of protrusions 36 is inwardly formed from a middle of each of upper and lower sections of the connecting portion 34. A groove 37 is defined between each pair of protrusions 36. Two posts 35 are inwardly formed from the baffle wall 32. An elongated horizontal sliding channel 38 is defined in a lower section of each side plate 24, below the corresponding receiving portion 30. A roller 40 is mounted to each side plate 24, and is disposed in a rear entry of the proximate sliding channel 38. A plurality of spaced locking hooks 42 extends upwardly from an upper edge of each side plate 24. A U-shaped retaining channel 44 is defined in a rear end of the chassis 12, for retaining the rectangular gasket 14. The retaining channel 44 is defined in the side plates 24 and the base plate 22.

Figures 3, 4:
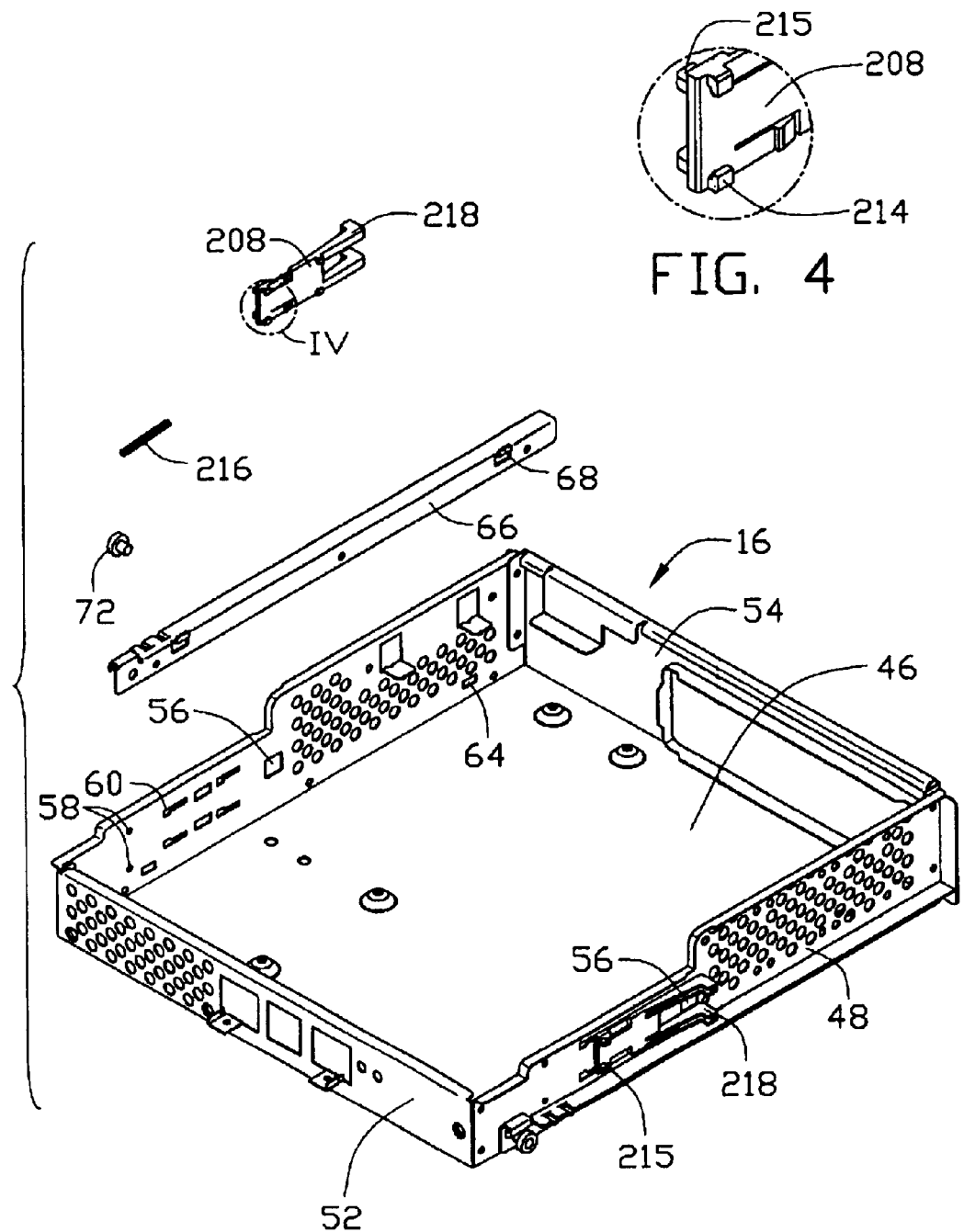
FIG. 3 is an isometric view of a frame and related parts of the computer enclosure of FIG. 1.
FIG. 4 is an enlarged view of an encircled portion IV of FIG. 3.
Figure 5:
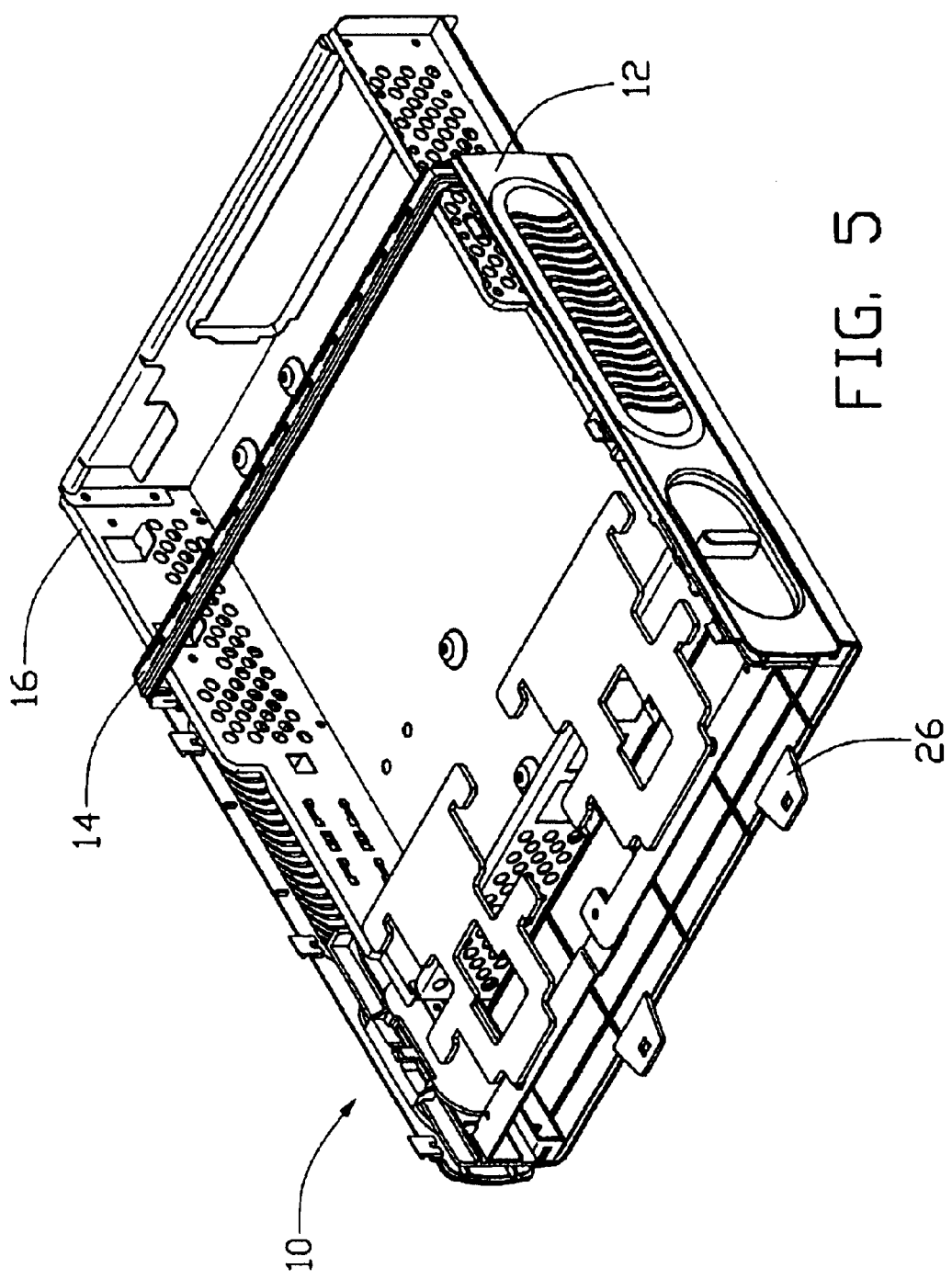
FIG. 5 is a partly assembled view of the frame assembled to the chassis.

Referring particularly to FIG. 3, the frame 16 is for being received in the chassis 12. The frame 16 comprises a bottom wall 46, two side walls 48, a front wall 52, and a rear wall 54. An upper section of each side wall 48 is stepped. An engaging aperture 56 is defined in a middle of each side wall 48. Two mounting apertures 58 and a plurality of slits 60 are defined in a front section of each side wall 48. A front end of each slit 60 is larger than an opposite rear end thereof. A pair of spaced mounting holes 64 is defined in a lower section of each side wall 48. A pair of slide rods 66 is provided. Each slide rod 66 has an L-shaped cross section. A pair of spaced L-shaped tabs 68 is inwardly formed from the slide rod 66, for insertion into the mounting holes 64 of the corresponding side wall 48. A pair of rollers 72 is provided for mounting to the slide rods 66.

Figure 7A:
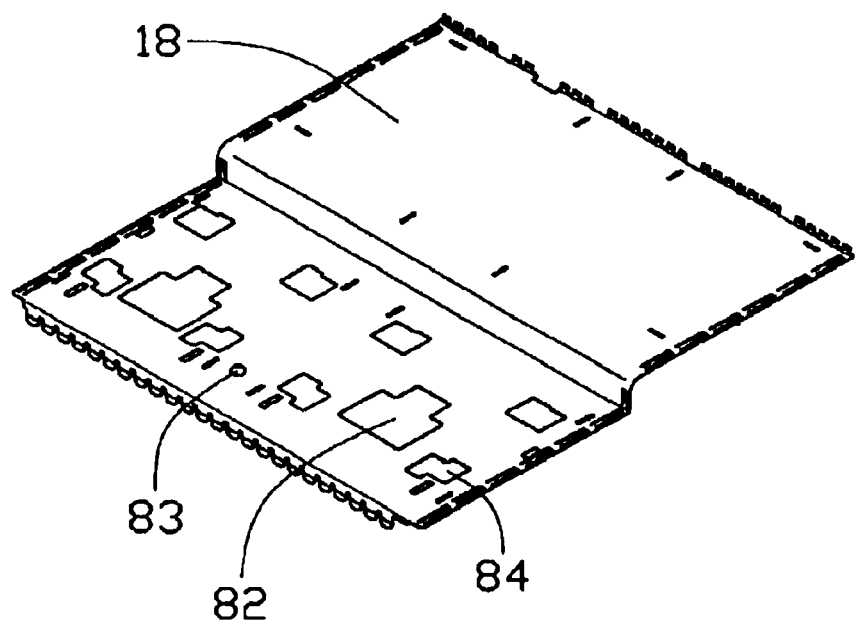
FIG. 7A is an isometric view of an anti-EMI (Electromagnetic Interference) plate of the computer enclosure of FIG. 1.
Figure 7B:
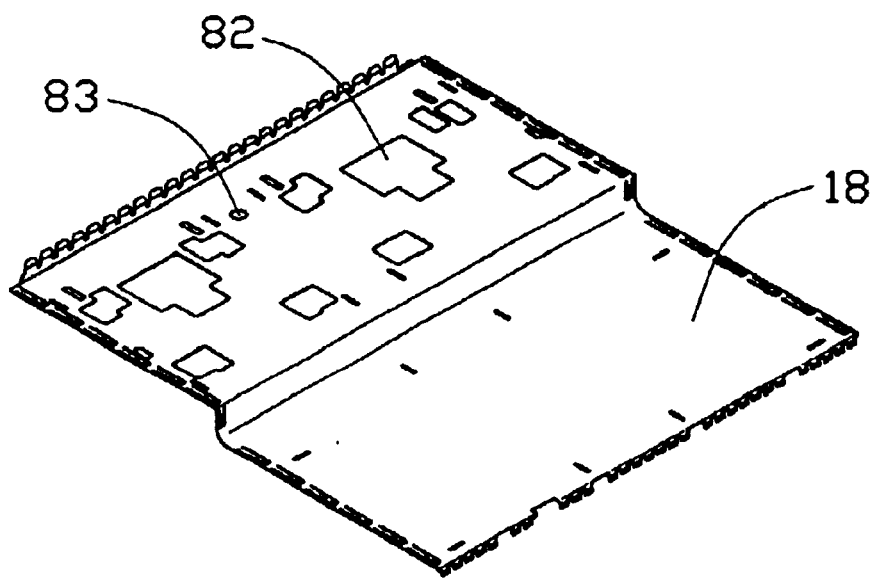
FIG. 7B is an isometric view of the anti-EMI plate of FIG. 7A, but showing the anti-EMI plate inverted.

Referring also to FIGS. 7A and 7B, the anti-EMI plate 18 is for being attached on the frame 16. The anti-EMI plate 18 has a stepped profile, corresponding to the side walls 48 of the frame 16. Two spaced through openings 82 are defined in a front section of the anti-EMI plate 18. A fixing bore 83 is defined in a middle of the front section of the anti-EMI plate 18, between the through openings 82. Four breaches 84 are defined in the front section of the anti-EMI plate 18 in the vicinity of four corners of one of the through openings 82. Another four breaches 84 are defined in the front section of the anti-EMI plate 18 in the vicinity of four corners of the other of the through openings 82.

Figure 8A:
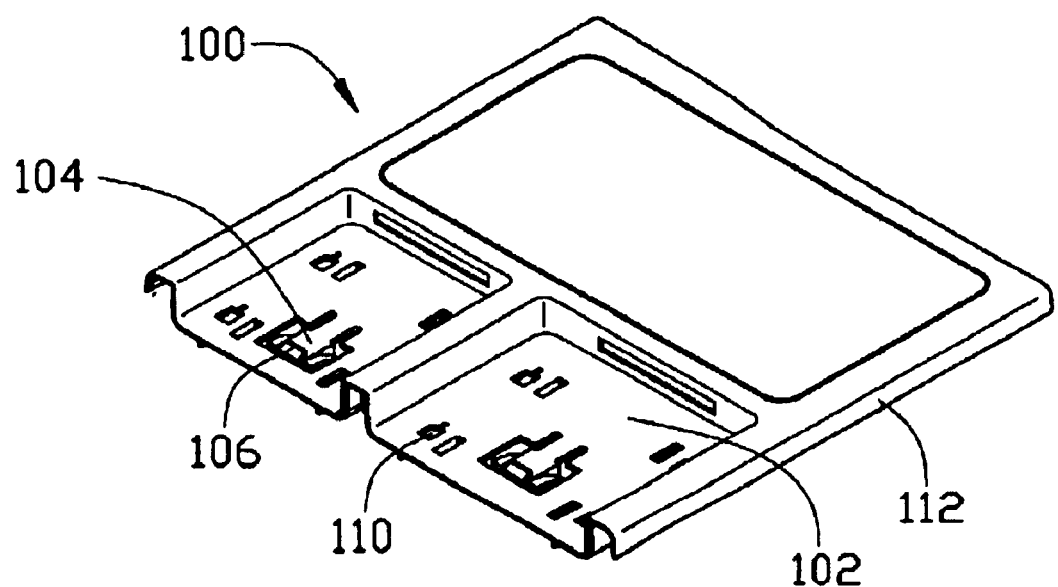
FIG. 8A is an isometric view of an upper plate of the computer enclosure of FIG. 1.
Figure 8B:
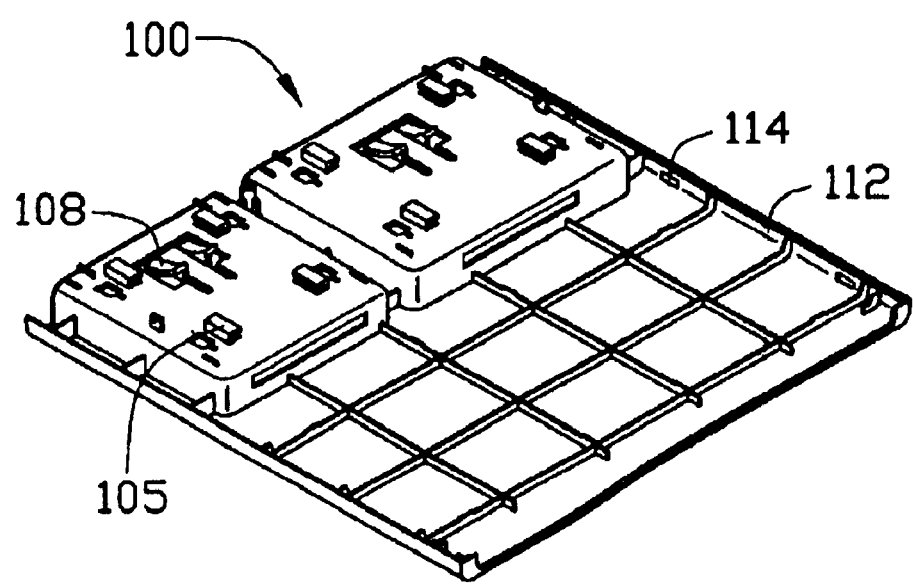
FIG. 8B is an isometric view of the upper plate of FIG. 8A, but showing the upper plate inverted.

Referring also to FIGS. 8A and 8B, the upper plate 100 is for being attached on the chassis 10 above the anti-EMI plate 18. A front section of the upper plate 100 is indented to form two recessed portions 102. A locking finger 104 is formed in a middle of each recessed portion 102. A barb 106 is upwardly formed at a free end of each locking finger 104. Two arcuate tabs 108 extend downwardly from the free end of each locking finger 104. A plurality of fixing apertures 110 is defined in each recessed portion 102. Four L-shaped protrusions 105 depend from near four corners respectively of each of the recessed portions 102. Two flanges 112 depend from opposite sides of the upper plate 100 respectively. A plurality of spaced locking apertures 114 is defined in each flange 112, corresponding to the locking hooks 42 of the chassis 12.

Figure 9A:
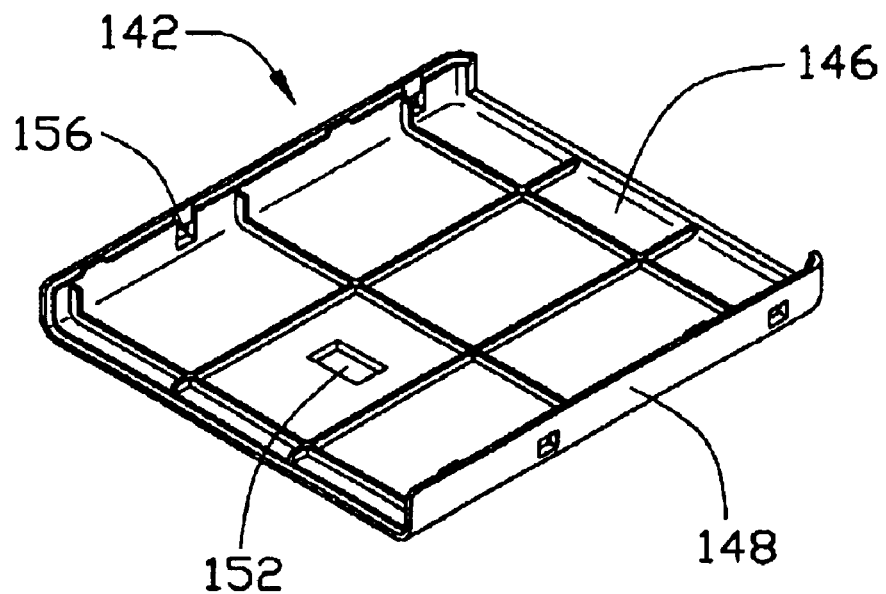
FIG. 9A is an enlarged isometric view of a lower part of an expansion body of the computer enclosure of FIG. 1.
Figure 9B:
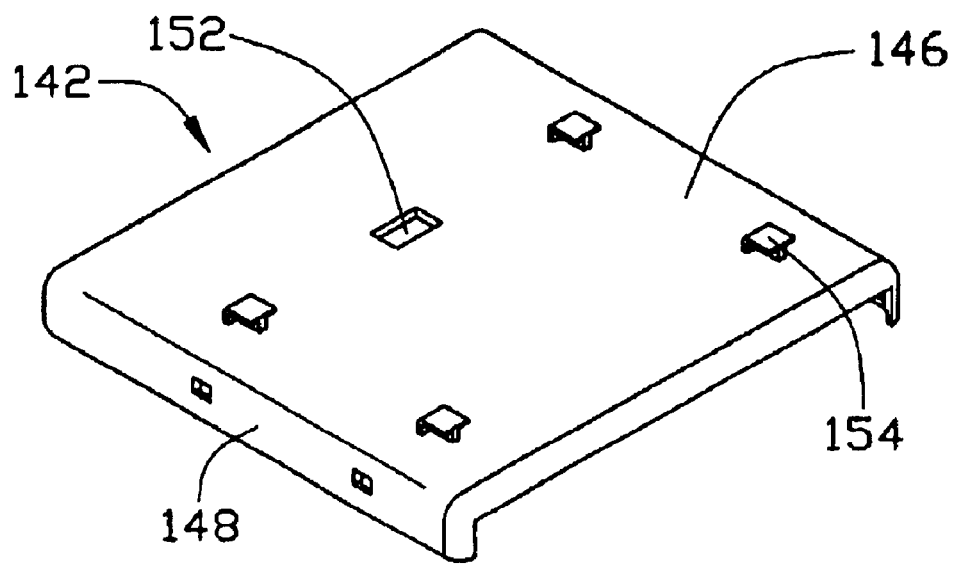
FIG. 9B is an isometric view of the lower part of the expansion body of FIG. 9A, but showing the lower part of the expansion body inverted.
Figure 10:
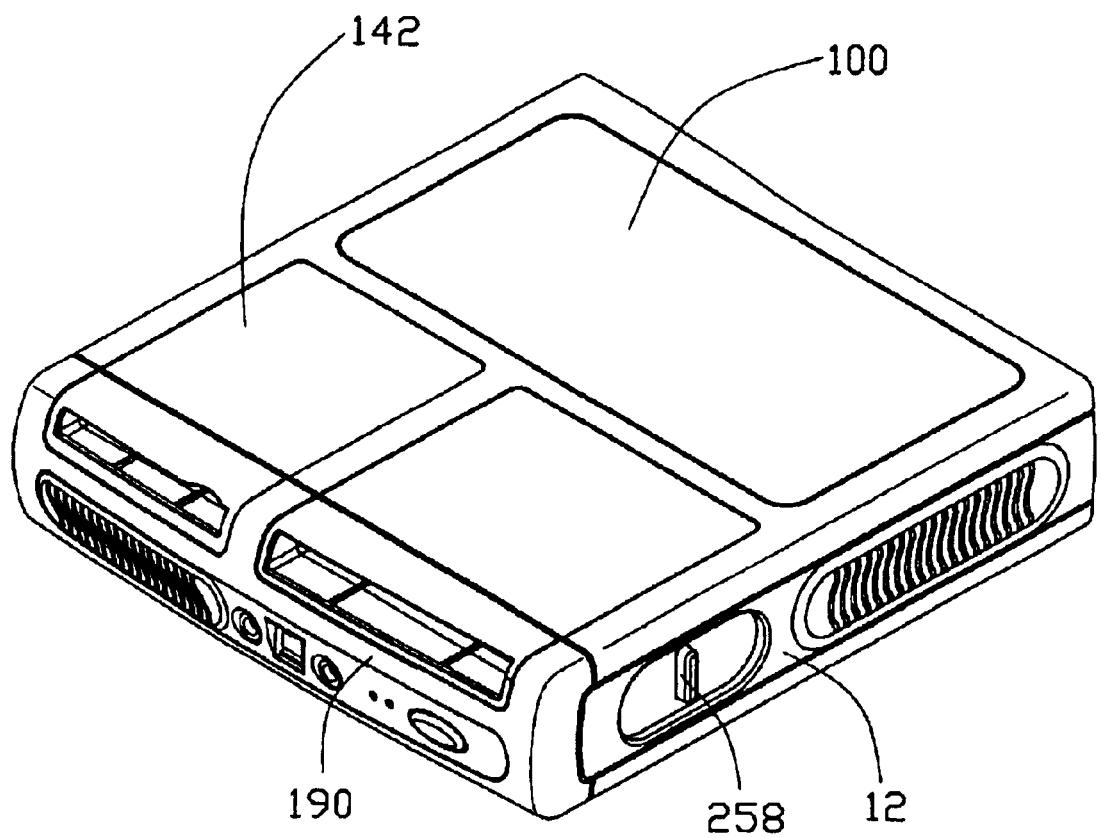
FIG. 10 is an assembled view of FIG. 1.

The expansion bodies 140 are respectively received into the recessed portions 102 of the upper plate 100. Each expansion body 140 comprises a lower part 142 and an upper part 144. Space (not labeled) is defined between the lower part 142 and the upper part 144, for accommodating data storage devices. Referring particularly to FIGS. 9A and 9B, the lower part 142 of each expansion body 140 has a bottom plate 146, and two side flanges 148 bent upwardly from opposite sides of the bottom plate 146 respectively. A locking opening 152 is defined in the bottom plate 146 of the lower part 142, for receiving the barb 106 of the locking finger 104 of the corresponding upper plate 100. Four generally T-shaped fixing tabs 154 are formed near four corners respectively of a bottom face of the bottom plate 146, for extension through the fixing apertures 110 of the corresponding recessed portion 102 and the breaches 84 of the anti-EMI plate 18. A pair of locking holes 156 is defined in each side flange 148.

A front edge of each upper part 144 bends downwardly to form a bezel (not labeled). An entrance 158 is defined in the bezel (see FIG. 1). A pair of catches 162 depends from each of opposite sides of the upper part 144, for extension into the locking holes 156 of the lower part 142.

Figure 2:
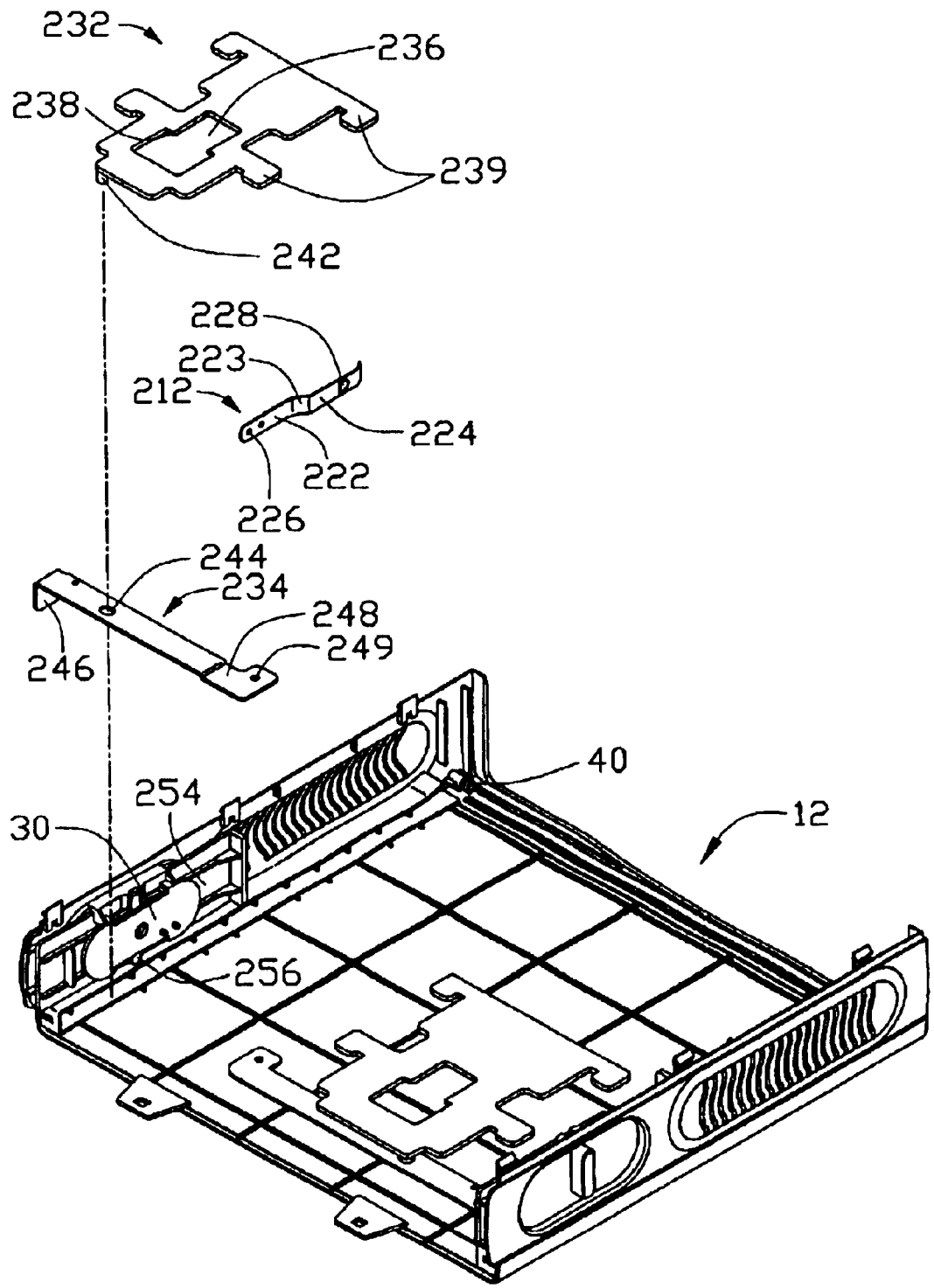
FIG. 2 is an isometric view of a chassis and related parts of the computer enclosure of FIG. 1.

Referring particularly to FIG. 1, each operating device 200 comprises a releasing device 202, a driving device 204, and a controlling device 206 for controlling the releasing and driving devices 202, 204. The releasing device 202 comprises a restoring tab 208, a pair of coil springs 216 (only one shown), and a locking strip 212. Referring also to FIGS. 3 and 4, a pair of L-shaped connecting legs 218 extends from an end of the restoring tab 208. Two pairs of spaced L-shaped projections 214 are formed at opposite sides respectively of an inner face of the restoring tab 208. A pair of spaced L-shaped projections 215 is formed at a front section of an opposite outer face of the restoring tab 208. Referring also to FIG. 2, the locking strip 212 comprises a fixing section 222, an intermediate resilient section 223, and a locking section 224. Two fixing holes 226 are defined in the fixing section 222. A clasp 228 is formed on the locking section 224.

When assembling each releasing device 202, the L-shaped projections 214 of the restoring tab 208 are respectively slid into the slits 60 of the corresponding side wall 48 of the frame 16. The restoring tab 208 is thereby attached to the frame 16. One end of each spring 216 is attached to a corresponding L-shaped projection 215 of the restoring tab 208. The other end of each spring 216 is attached in a corresponding mounting aperture 58 of the corresponding side wall 48 of the frame 16. The locking strip 212 is attached to an inside of the baffle wall 32 of the corresponding receiving portion 30 of the chassis 12. The posts 35 of the baffle wall 32 are engaged in the fixing holes 226 of the fixing section 222 of the locking strip 212. Each locking strip 212 is located between the connecting legs 218 of the corresponding restoring tab 208. The clasp 228 of each locking strip 212 engages in the aperture 56 of the corresponding side wall 48 of the frame 16.

The driving devices 204 are for being attached to a bottom surface of the anti-EMI plate 18. Referring particularly to FIGS. 1 and 2, each driving device 204 comprises a driving board 232 and a driving arm 234. A through opening 236 is defined in a center of the driving board 232. The through opening 236 comprises a wide portion and a narrower portion. Thus two shoulders 238 are inwardly formed in the driving board 232 at opposite sides of the through opening 236 respectively. A pair of spaced driving tabs 239 extends coplanarly outwardly from each of opposite sides of the driving board 232. A stud 242 depends from a front of the driving board 232. A receiving hole 244 is defined in the driving arm 234, for receiving the stud 242 of the driving board 232. A tab 246 depends from one end of the driving arm 234 that is nearest the receiving hole 244. A generally L-shaped pivot section 248 is formed at an opposite end of the driving arm 234. A pivot hole 249 is defined in the pivot section 248, corresponding to the fixing bore 83 of the anti-EMI plate 18.

When assembling each driving device 204, the driving board 232 is slidingly attached in a receiving space (not labeled) defined between the L-shaped protrusions 105 of a corresponding recessed portion 102 of the upper plate 100. The driving tabs 239 of the driving board 232 abut against the fixing tabs 154 of the corresponding expansion body 140. The stud 242 of the driving board 232 is received in the receiving hole 244 of the driving arm 234. The pivot sections 248 of the driving arms 234 of the driving devices 204 partly overlap, such that the pivot holes 249 of the pivot sections 248 are aligned with each other. A bolt (not shown) is extended through the pivot holes 249 and the fixing bore 83 of the anti-EMI plate 18.

Referring particularly to FIGS. 1 and 6, the controlling devices 206 are respectively received in the receiving portions 30 of the side walls 24 of the chassis 12. Each controlling device 206 comprises a driving plate 254, a resilient member 256, and an operation button 258. The driving plate 254 is rectangular, and can slidably fit through the horizontal passage 33b of each receiving portion 30. A vertical slot 262 is defined in a middle of the driving plate 254. A pair of parallel longitudinal reinforcing ribs 263 is formed on an inside face of the driving plate 254, at each of opposite sides of the slot 262. A pair of parallel vertical beams 264 is formed on the inside face of the driving plate 254, at opposite sides respectively of the slot 262. A vertical beam 266 is formed on the inside face of the driving plate 254, in the vicinity of a front end of the driving plate 254. The beams 264, 266 respectively integrally connect between the corresponding parallel ribs 263. A push tab 265 extends perpendicularly inwardly from a rear end of the driving plate 254.

The resilient member 256 is rectangular, and can movably fit in the vertical passage 33a of each receiving portion 30. A threaded hole 268 is defined in a middle of the resilient member 256. A pair of arcuate resilient tabs 272 is inwardly formed from the resilient member 256 at opposite sides of the threaded hole 268 respectively. A retaining boss 274 extends upwardly from a middle of a top edge of the resilient member 256. Another retaining boss 274 depends from a middle of a bottom edge of the resilient member 256.

In assembling each controlling device 206, the resilient member 256 is received between the beams 264 of the driving plate 254. The combined driving plate 254 and resilient member 256 is inserted into the corresponding receiving portion 30 from a rear end of the receiving portion 30. The beam 266 of the driving plate 254 is disposed beyond a front end of the receiving portion 30. The retaining bosses 274 are accommodated in the grooves 37 of the connecting portion 34 of the receiving portion 30. The resilient tabs 272 resiliently abut against the baffle wall 32 of the receiving portion 30. The operation button 258 is extended through the slot 262 of the driving plate 254. A screw (not labeled) is inserted through a hole in the baffle wall 32, and engaged in the threaded hole 268 of the resilient member 256 and a threaded hole of the operation button 258. The operation button 258 is thus attached to the resilient member 256. The push tab 265 of the driving plate 254 abuts against the L-shaped connecting legs 218 of the corresponding restoring tab 208. The beam 266 of the driving plate 254 abuts against the tab 246 of the corresponding driving device 204 (see especially FIGS. 2 and 6).

Referring to FIGS. 1–10, in assembly, the gasket 14 is mounted to a rear section of the chassis 12 in the U-shaped retaining channel 44. The L-shaped tabs 68 of the slide rods 66 are engaged in the mounting holes 64 of the corresponding side wall 48 of the frame 16. The slide rods 66 are thereby attached to the frame 16. The rollers 72 are respectively mounted to front ends of the slide rods 66. The frame 16 is slid into the chassis 12, with the slide rods 66 sliding along the sliding channels 38. The clasps 228 of the locking strips 212 are snappingly engaged in the engaging apertures 56 of the corresponding side walls 48 of the frame 16. Then, the anti-EMI plate 18 is placed onto the cage 10. Then, the upper plate 100 is attached to the chassis 12. The locking hooks 42 of the chassis 12 are engaged in the locking apertures 114 of the flanges 112 of the upper plate 100. Then the upper part 144 of each expansion body 140 is engaged with the lower part 142 thereof. The catches 162 of the upper part 144 are engagingly received in the locking holes 156 of the lower part 142. Then the expansion bodies 140 are respectively secured in the recessed portions 102 of the upper plate 100. The barbs 106 of the locking fingers 104 of the recessed portions 102 are engaged in the locking openings 152 of the lower parts 142 of the expansion bodies 140. The fixing tabs 154 of the lower parts 142 of the expansion bodies 140 are extended through the fixing apertures 110 of the recessed portions 102 and through the breaches 84 of the anti-EMI plate 18, so that the fixing tabs 154 abut against the driving tabs 239 of the driving boards 232 of the driving devices 204.

In disassembling each expansion body 140 from the upper plate 100, the operation button 258 of the corresponding controlling device 206 is pressed inwardly. This drives the retaining bosses 274 of the resilient member 256 of the controlling device 206 to exit from the grooves 37 of the corresponding receiving portion 30. Then, the operation button 258 is pushed forwardly to drive the driving plate 254 of the controlling device 206 forwardly. The beam 266 of the driving plate 254 drives the tab 246 of the driving arm 234 of the corresponding driving device 204 to move forwardly. The driving arm 234 rotates about the pivot section 248 thereof, and the corresponding driving board 232 of the driving device 204 is moved forwardly. The driving tabs 239 of the driving board 232 drive the fixing tabs 154 of the expansion body 140 to move forwardly to a releasable position. The shoulders 238 of the driving board 232 pressingly abut against the arcuate tabs 108 of the corresponding locking finger 104, thereby depressing the locking finger 104. The barb 106 of the locking finger 104 is released from the locking opening 152 of the expansion body 140. Then, the expansion body 140 is easily taken out from the upper plate 100.

In disassembling the frame 16 from the chassis 12, the operation buttons 258 are pressed inwardly and then pushed rearwardly. The driving plates 254 are thus driven to move rearwardly. The push tabs 265 of the driving plates 254 drive the L-shaped connecting legs 218 of the restoring tabs 208 to move rearwardly. The restoring tabs 208 press the resilient sections 223 of the locking strips 212 of the releasing devices 202. Thus, the clasps 228 of the locking strips 212 are disengaged from the engaging apertures 56 of the frame 16. The frame 16 is then easily slid out from the chassis 12.

It is understood that the invention may be embodied in other forms without departing from the spirit thereof. Thus, the present example and embodiment are to be considered in all respects as illustrative and not restrictive, and the invention is not to be limited to the details given herein.

What is claimed is:

1. A computer enclosure, comprising:
    a cage having a chassis and a frame attached to chassis, the chassis comprising a base plate and two side plates, a receiving portion inwardly formed from at least one side plate, the frame having two side walls, an engaging aperture being defined in at least one side wall; and
    at least one operating device comprising a releasing device, and a controlling device accommodating in the receiving portion of the chassis, the releasing device having a restoring tab and a resilient locking strip, one end of the restoring tab forming a connecting portion, one end of the locking strip being attached on the receiving portion of the chassis, the other end of the locking strip having an engaging portion to engage in the engaging aperture of the frame, the controlling device having a driving plate, a resilient member, and an operation button, wherein
    when the operation button is pushed to drive the driving plate rearwardly, the restoring tab presses the resilient locking strip to release the engaging portion from engagement in the engaging aperture of the frame.

2. The computer enclosure as described in claim 1, wherein a sliding slot is defined in a bottom portion of each of the side plates of the chassis, and the frame slides into the chassis along the sliding slots.

3. The computer enclosure as described in claim 2, wherein a slide rod is attached to each of the side walls of the frame, for sliding along the sliding slots of the chassis.

4. The computer enclosure as described in claim 1, wherein the receiving portion comprises a baffle wall and a connecting portion, the connecting portion connects the baffle wall to one of the side plates, and a passage is defined in the connecting portion.

5. The computer enclosure as described in claim 4, wherein two protrusions are inwardly formed from the connecting portion, thereby defining a groove therebetween.

6. The computer enclosure as described in claim 5, wherein a retaining boss is formed at the resilient member, and the retaining boss is accommodated in the groove of the connecting portion.

7. The computer enclosure as described in claim 1, wherein a fixing hole is defined in said one end of the locking strip, and a post is inwardly formed from the baffle wall of the receiving portion of the chassis for engaging with the fixing hole of the locking strip and thereby attaching the locking strip to the receiving portion.

8. The computer enclosure as described in claim 1, wherein a plurality of slits is defined in the at least one side wall of the frame, and a plurality of L-shaped projections is formed from one surface of the restoring tab for slidably engaging in the slits of the frame.

9. The computer enclosure as described in claim 8, wherein a mounting aperture is defined in the at least one side wall of the frame in front of the slits, one end of a spring is attached to the restoring tab, and an opposite end of the spring is attached in the mounting aperture.

10. The computer enclosure as described in claim 1, wherein a slot is defined in the driving plate, the operation button extends through said slot, and a push tab is inwardly formed from a rear end of the driving plate for abutting against the connecting portion of the restoring tab.

11. The computer enclosure as described in claim 1, wherein a threaded hole is defined in the resilient member, for extension of a screw therethrough to thereby engage the resilient member with the operation button.

12. A computer enclosure, comprising:
a cage comprising a chassis and a frame;
a upper plate attached to the cage, the upper plate having at least one receiving portion, a bottom of the at least one receiving portion forming a locking section and a plurality of fixing apertures; and
at least one expansion body accommodated in the at least one receiving portion of the upper plate, the at least one expansion body having a locking opening engaging with the locking section of the upper plate, and a plurality of fixing tabs engaging in the fixing apertures of the upper plate; and
at least one operating device comprising a driving device, and a controlling device attached to a receiving portion of one side plate of the chassis, the driving device having a driving board and a driving arm connecting with the driving board, the driving board having a plurality of driving tabs respectively abutting against the fixing tabs of the at least one expansion body, the driving arm being pivotable about one end thereof and having a tab at a free end thereof, the controlling device having a driving plate and an operation button, the driving plate having a beam abutting against the tab of the driving arm, wherein when the driving button drives the driving plate to move, the driving plate drives the driving arm to pivotably move, so that the driving board is moved to drive the locking section to disengage from the locking opening of the expansion body, whereupon the fixing tabs of the expansion body disengage from the fixing apertures of the upper plate.

13. The computer enclosure as described in claim 12, wherein the locking section has a barb, and an arcuate resilient tab depends from the locking section.

14. The computer enclosure as described in claim 12, wherein the fixing tabs of the at least one expansion body are T-shaped, and one end of each of the fixing apertures of the upper plate is larger than the other end.

15. The computer enclosure as described in claim 12, wherein upper sections of two side walls of the frame are stepped, and a stepped anti-EMI plate is attached to the frame.

16. The computer enclosure as described in claim 15, wherein the anti-EMI plate defines a plurality of apertures therein, corresponding to the locking section of the upper plate and the fixing tabs of the at least one expansion body.

17. The computer enclosure as described in claim 15, wherein the driving arm is pivotably connected to the anti-EMI plate.

18. The computer enclosure as described in claim 12, wherein a plurality of L-shaped protrusions is formed at the bottom of the at least one receiving portion of the upper plate, and the driving board of the driving device is slidably retained under the at least one receiving portion by the protrusions.

19. The computer enclosure as described in claim 12, wherein the driving plate of the controlling device defines a through opening movably receiving the operation button, and the controlling device further has a resilient member attached to the operation button.

20. The computer enclosure as described in claim 19, wherein the receiving portion of the side plate of the chassis has a baffle wall and a connecting portion connecting the baffle wall to the side plate of the chassis.

21. The computer enclosure as described in claim 20, wherein a pair of protrusions is formed at the connecting portion defining a groove therebetween.

22. The computer enclosure as described in claim 21, wherein a retaining boss is formed at the resilient member and accommodated in the groove of the connecting portion.

23. A computer enclosure comprising:
a cage including a chassis;
a frame attached to the chassis;
an upper plate attached to the cage and defining a receiving portion therein;
an expansion body received in the receiving portion; and
an operation device including a driving device and a releasing device respectively actuated by a controlling device; wherein
when said controlling device moves in a first direction, the driving device is actuated to disengage the expansion body from the upper plate, while when said controlling device moves in a second direction opposite to said first direction, the releasing device is actuated to disengage the frame from the chassis.

* * * * *